Patented Feb. 9, 1943

2,310,375

UNITED STATES PATENT OFFICE 2,310,375

POLYMERIZATION OF ACYCLIC TERPENES IN THE PRESENCE OF A PHOSPHORIC ACID CATALYST

Alfred L. Rummelsburg, Wilmington, Del., assignor to Hercules Powder Company, Wilmington, Del., a corporation of Delaware No Drawing. Application May 31, 1941,
Serial No. 396,213

16 Claims. (Cl. 260—666)

This invention relates to the polymerization of acyclic terpenes having three double bonds per molecule and to the products formed thereby. More particularly, it relates to an improved method of polymerizing acyclic terpenes having three double bonds per molecule whereby an improved product is obtained.

The art discloses that allo-ocimene, an acyclic terpene having three double bonds per molecule, polymerizes in the presence of sulfuric acid or a sulfuric acid-acetic acid catalyst. The product is described as a brown liquid resin which analysis shows to be composed of polymers of allo-ocimene and various by-products. It has been found, however, that sulfuric acid causes charring of the allo-ocimene or its polymers. As a consequence, the product is dark in color and is obtained in reduced yield. In addition, sulfuric acid is a strong sulfonating agent. Hence, by-products are formed which further reduce the yield and necessitate additional operations to secure the polymerized allo-ocimene in purified form.

This invention has as an object to provide an improved process for the production of polymers of acyclic terpenes having three double bonds per molecule.

Another object is to provide a process for the production of improved polymers of acyclic terpenes having three double bonds per molecule.

A further object is to provide a process for the production of improved polymers of acyclic terpenes having three double bonds per molecule, which polymers consist substantially entirely of the dimer.

A further object is to provide an improved process for the production of polymerized allo-ocimene.

A still further object is to provide a process for the production of an improved polymerized allo-ocimene which consists substantially entirely of the dimer.

Other objects will appear hereinafter.

These objects are, in general, accomplished by polymerizing an acyclic terpene having three double bonds per molecule in the presence of a phosphoric acid catalyst. It has been found that when such an acyclic terpene is brought into contact with phosphoric acid, polymerization takes place without any attendant charring or sulfonation. It has further been found that by using a phosphoric acid catalyst and by suitably controlling the reaction, it is possible to produce a polymerized acyclic terpene which consists substantially entirely of the dimer.

In accordance with this invention, any acyclic terpene having three double bonds per molecule, as for example, allo-ocimene, ocimene, myrcene, etc., may be employed. In particular, allo-ocimene is preferably employed inasmuch as, in addition to having three double bonds per molecule, this compound has the double bonds in a triply conjugated arrangement. Hereinafter, in this specification, an acyclic terpene having three double bonds per molecule will be referred to for convenience merely as an acyclic terpene.

In accordance with this invention, the acyclic terpene may be used either alone or dissolved in a suitable solvent. Desirably, however, the polymerization is carried out with the acyclic terpene dissolved in an inert, volatile, organic solvent. Examples of such solvents are: aromatic hydrocarbons, such as, benzene, toluene, xylene, cymene, etc.; aliphatic hydrocarbons, such as, gasoline, butane, cyclohexane, decahydronaphthalene, petroleum ether, V. M. & P. naphtha, hydrogenated petroleum naphtha, etc.; chlorinated hydrocarbons, such as, chloroform, ethylene dichloride, carbon tetrachloride, trichloroethylene, tetrachloroethane, pentachloroethane, propylene dichloride, monochlorobenzene, etc.; esters, as ethyl acetate, etc.; ethers, as isopropyl ether, etc. When a solvent is used, the concentration of the acyclic terpene in the solution should preferably be within the range of from about 10% to about 75% by weight based on the weight of the solution.

The catalyst may be incorporated in the above solution either by dispersion or by dissolution. Furthermore, either the dispersion or the dissolution may be aided by dissolving the acyclic terpene in a suitable solvent and then adding the catalyst. Alternatively, the catalyst may first be dissolved or dispersed in a solvent and the acyclic terpene then added. When a "solid phosphoric acid" catalyst is used, the acyclic terpene may be polymerized by passing it continuously over the supported catalyst using a tubular reaction system.

Various types of phosphoric acid may be employed as the catalytic agent in accordance with this invention. For example, commercial 85% orthophosphoric acid; 100% phosphoric acid prepared by adding $P_2O_5$ to 85% orthophosphoric acid; tetraphosphoric acid prepared by adding $P_2O_5$ to orthophosphoric acid; hypophosphoric acid; metaphosphoric acid; pyrophosphoric acid, etc., may be used. Phosphorus pentoxide itself may be used and it is contemplated that it be considered as an equivalent for the above-named phosphoric acids. The preferable catalysts to use in accordance with this invention are ortho- and tetraphosphoric acids. Also varying amounts of the above catalytic agents may be used; however, it is preferred to use not more than about 25% by weight of the catalytic agent based on the amount of acyclic terpene employed. It is further preferred to use an amount of catalyst within the range of from about 2% to about 10% based on the acyclic terpene.

By "solid phosphoric acid," hereinabove referred to, there is contemplated a supported catalyst prepared by impregnating or suspending phosphoric acid on the surface of an inert mass. For example, a siliceous, aluminous, or carbonaceous material may be used as the support. Siliceous materials may comprise alumina, bauxite, fuller's earth, bentonite, kieselguhr, fusorial earth, pumice, fireclays, and the like. If desired, the impregnated or coated mass may be heat treated at temperatures of from 100° C. to 300° C. prior to use. Any such "solid phosphoric acid" catalyst may be utilized in accordance with the instant invention.

The polymerization inherent in this invention may be carried out over a wide range of temperature. It is desirable, however, to use a temperature within the range of from about 0° C. to about 200° C. and the preferable range is between about 10° C. and about 150° C. Where low boiling solvents are employed, it is convenient to use temperatures at or below the reflux temperature of the reaction mixture.

Prior to recovering the polymerized product from the reaction mixture, it is desirable to remove traces of phosphate esters which may be present. These esters form during the treatment with the catalyst, and they act as emulsifying agents during the later water washing. Hence, it is desirable to decompose the same prior to the water washing step. This can be accomplished by means of hydrolysis with aqueous inorganic acids such as $H_3PO_4$, $H_2SO_4$, HCl, $HNO_3$, $H_3BO_3$, $NaHSO_4$, etc., at a temperature within the range of from about 50° C. to about 200° C., at acid concentrations of from about 1 to about 60 percent, for a period of from about 5 minutes to about 5 hours. Since the reaction mixture contains phosphoric acid, hydrolysis may be accomplished by diluting the same mixture with sufficient water to give an aqueous phosphoric acid of the desired strength. The entire mixture is then vigorously agitated until hydrolysis of the emulsifying agents is accomplished. If a hydrolytic agent other than aqueous $H_3PO_4$ is desired, the aqueous $H_3PO_4$ can be separated from the reaction mixture directly following dilution, and another hydrolytic agent then added.

Prior to recovering the polymerized product from the solvent, if one has been used, the solution is washed and preferably with water. The water washing may be hot or cold; furthermore, it is often desirable to use an alkali metal salt such as NaCl, $Na_2SO_4$, etc., during the washing process, in order to prevent emulsification. Dilute alkalies may also be used during the water washing to accomplish the same purpose.

In carrying out the invention as broadly described with a phosphoric acid catalyst, a liquid product is formed consisting of a substantial quantity of the dimer. In actual practice, the product will contain from about 75% to about 95% of the dimer, depending upon the conditions of reaction, such as, the type of phosphoric acid used, the concentration of catalyst, the particular solvent, temperature of reaction, etc. The product is also more unsaturated than the liquid polymers of cyclic terpenes, such as, pinene, dipentene, etc., and has a thiocyanate value within the range of from about 120 to about 240.

It will be understood that in carrying out this invention in its broadest aspects the acyclic terpene may be used in a substantially pure state or in an admixture with other terpenes, which admixture, however, contains substantial quantities of an acyclic terpene. The other terpenes may or may not polymerize in the reaction depending upon their nature. For example, an impure allo-ocimene to which the invention may be applied is that obtained by the pyrolysis of α-pinene. It has been found that when α-pinene is pyrolyzed under suitable conditions of temperature and contact time of the vapor with the reaction tube, there is produced a substantial quantity of allo-ocimene, in addition to dipentene and other complex terpenes in quantities determined by the conditions of the reaction. For further detail, see application for U. S. Letters Patent by A. L. Rummelsburg, Serial No. 368,364 filed December 3, 1940. In addition, the suitable pyrolysis of β-pinene at say 400° C. yields as much as 67% myrcene in conjunction with other terpenes. This mixture may, if desired, be subjected to conditions of polymerization.

The present process may be carried out either continuously or by the batch method. In the continuous process, a mixture of the catalyst, inert solvent and acyclic terpene is fed through a coil of pipe where it is held at a desirable temperature. The rate of flow is governed in such a manner that the reaction is substantially complete by the time the mixture reaches the end of this coil of pipe. The mixture then flows into an enlarged chamber where it is treated to remove the catalyst and further purify the product. As an alternative to the continuous process just described and in particular where a "solid phosphoric acid" catalyst is employed, the acyclic terpene or its solutions may be continuously passed over the supported catalyst in a tube, at a suitable temperature and contact time.

The following examples demonstrate the practical application of the principles of the present invention which, however, are not to be construed as limiting. All parts and percentages are by weight unless otherwise indicated.

*Example 1*

Five hundred parts of 95% allo-ocimene and 5 parts of 100% orthophosphoric acid were agitated for one hour at 150° C. under reflux. The reaction mixture was washed with water to remove the catalyst. Any unpolymerized constituents were removed by vacuum distillation at 15 mm. pressure, using a final bath temperature of 150° C. 400 parts of polymerized material were obtained as the product which was a viscous oil having a color of I on the rosin scale and a thiocyanate value of 130.

*Example 2*

Two hundred and fifty parts of 95% allo-ocimene were dissolved in 100 parts of xylene. The solution was agitated under reflux with 10 parts of tetraphosphoric acid for 2 hours at 140°

C., then cooled and water washed to remove the catalyst. The xylene and unpolymerized constituents were removed by vacuum distillation at 15 mm. pressure, using a final bath temperature of 150° C. A polymerized material in the form of a viscous oil, having a color of H on the rosin scale and a thiocyanate value of 140 resulted.

*Example 3*

Three hundred parts of 90% allo-ocimene were dissolved in 300 parts of narrow range gasoline having a boiling point of 90° C. to 130° C. This solution was agitated with 20 parts of 85% orthophosphoric acid for 2 hours at 100° C. under reflux. The reaction mixture was cooled, decanted from a small amount of catalyst, water washed, and the solvent removed by vacuum distillation at 15 mm. pressure, using a final bath temperature of 150° C. 260 parts of a viscous oil remained as the product which had a color of K on the rosin scale and a thiocyanate value of 155.

*Example 4*

Five hundred parts of a mixture of terpenes obtained by pyrolyzing α-pinene at 395° C., containing approximately 40% allo-ocimene, were agitated with 10 parts of 85% orthophosphoric acid under reflux at 125° C. for 4 hours. After separating the solution from insoluble catalyst, water washing, and removal of the unreacted constituents by vacuum distillation, at 15 mm. pressure, 180 parts of polymerized material remained. It was a viscous oil which had a thiocyanate value of 180 and a color of H on the rosin scale.

*Example 5*

A mixture of 5 parts of 90% allo-ocimene and 2 parts of 85% orthophosphoric acid were allowed to stand at room temperature for 90 hours with intermittent agitation. The reaction mixture was then diluted with benzene and water washed. Removal of the solvent by reduced pressure distillation at 20 mm. left about 5 parts of viscous oil, having a thiocyanate value of 201 and a color of K on the rosin scale.

The color of the liquid polymers of this invention may be improved by treatment with adsorbents such as silica gel, fuller's earth, bauxite, activated carbon, activated magnesium and aluminum silicates, etc. This treatment may be employed either before or after removal of the inert solvent. Other refining agents which may be employed include selective solvents such as furfural, furfuryl alcohol, phenol, etc.

The processes of my invention contribute definite improvements over the prior art in that they provide a method for the polymerization of acyclic terpenes to obtain useful liquid polymers without charring or sulfonating the reactants or the product. At the same time there is obtained a higher yield of polymeric acylic terpene after the impurities, unreacted constituents, etc., have been removed. Furthermore, this polymeric product consists substantially entirely of the dimer.

The liquid polymers produced by virtue of my invention are much more unsaturated than the liquid polymers of cyclic terpenes, such as, liquid polydipentene, "Dipolymer," liquid polypinene, etc. Hence, they react more readily with many other compounds. For example, maleic anhydride will react with the polymers, and the resulting product may be further esterified with mono- and polyhydric alcohols. The products are resins which may be incorporated in protective coatings. Phenol may also be reacted with these liquid polymers and that product in turn reacted with formaldehyde to form resins which are soluble in drying oils. Further, these polymers may be sulfonated to yield products having sudsing and wetting out properties in aqueous solution.

It will be understood that the details and examples hereinbefore set forth are illustrative only and the invention as broadly described and claimed is in no way limited thereby.

This application constitutes a continuation-in-part of my application for United States Letters Patent, Serial No. 370,665, filed December 18, 1940.

What I claim and desire to protect by Letters Patent is:

1. The process of polymerizing an acyclic terpene having three double bonds per molecule which comprises contacting said acyclic terpene in liquid phase with a phosphoric acid catalyst.

2. The process of polymerizing an acyclic terpene having three double bonds per molecule which comprises contacting said acyclic terpene in liquid phase with a phosphoric acid catalyst at a temperature within the range of from about 0° C. to about 200° C.

3. The process of polymerizing an acyclic terpene having three double bonds per molecule which comprises contacting said acyclic terpene in liquid phase with a phosphoric acid catalyst at a temperature within the range of from about 10° C. to about 150° C.

4. The process of polymerizing an acyclic terpene having three double bonds per molecule which comprises contacting said acyclic terpene with a phosphoric acid catalyst at a temperature within the range of from about 10° C. to about 150° C., and hydrolyzing the phosphate esters formed by heating the polymerized product with an aqueous inorganic acid having an acid concentration between about 1% and about 60% by weight.

5. The process of polymerizing allo-ocimene which comprises contacting said material in liquid phase with a phosphoric acid catalyst.

6. The process of polymerizing ocimene which comprises contacting said material in liquid phase with a phosphoric acid catalyst.

7. The process of polymerizing myrcene which comprises contacting said material in liquid phase with a phosphoric acid catalyst.

8. The process of polymerizing allo-ocimene which comprises contacting said material, dissolved in an inert, volatile, organic solvent, with a phosphoric acid catalyst, at a temperature within the range of from about 0° C. to about 200° C.

9. The process of polymerizing ocimene which comprises contacting said material, dissolved in an inert, volatile, organic solvent, with a phosphoric acid catalyst, at a temperature within the range of from about 0° C. to about 200° C.

10. The process of polymerizing myrcene which comprises contacting said material, dissolved in an inert, volatile, organic solvent, with a phosphoric acid catalyst, at a temperature within the range of from about 0° C. to about 200° C.

11. The process of polymerizing allo-ocimene which comprises contacting said material, dissolved in an inert, volatile, organic solvent, with a phosphoric acid catalyst, at a temperature within the range of from about 10° C. to about 150° C., hydrolyzing the phosphate esters formed by heating the polymerized product with an aqueous inorganic acid having an acid concentration between about 1% and about 60% by weight, separating the phase containing the polymerized material, and recovering the same.

12. The process of polymerizing ocimene which comprises said material, dissolved in an inert, volatile, organic solvent, with a phosphoric acid catalyst, at a temperature within the range of from about 10° C. to about 150° C., hydrolyzing the phosphate esters formed by heating the polymerized product with an aqueous inorganic acid having an acid concentration between about 1% and about 60% by weight, separating the phase containing the polymerized material, and recovering the same.

13. The process of polymerizing myrcene which comprises contacting said material, dissolved in an inert, volatile, organic solvent, with a phosphoric acid catalyst, at a temperature within the range of from about 10° C. to about 150° C., hydrolyzing the phosphate esters formed by heating the polymerized product with an aqueous inorganic acid having an acid concentration between about 1% and about 60% by weight, separating the phase containing the polymerized material, and recovering the same.

14. The process of polymerizing allo-ocimene which comprises contacting said material, dissolved in gasoline, with orthophosphoric acid as catalyst, at a temperature within the range of from about 10° C. to about 150° C., hydrolyzing the phosphate esters formed by heating the polymerized product with an aqueous inorganic acid having an acid concentration between about 1% and about 60% by weight, separating the phase containing the polymerized material, and recovering the same.

15. The process of polymerizing ocimene which comprises contacting said material, dissolved in gasoline, with orthophosphoric acid as catalyst, at a temperature within the range of from about 10° C. to about 150° C., hydrolyzing the phosphate esters formed by heating the polymerized product with an aqueous inorganic acid having an acid concentration between about 1% and about 60% by weight, separating the phase containing the polymerized material, and recovering the same.

16. The process of polymerizing myrcene which comprises contacting said material, dissolved in gasoline, with orthophosphoric acid as catalyst, at a temperature within the range of from about 10° C. to about 150° C., hydrolyzing the phosphate esters formed by heating the polymerized product with an aqueous inorganic acid having an acid concentration between about 1% and about 60% by weight, separating the phase containing the polymerized material, and recovering the same.

ALFRED L. RUMMELSBURG.

CERTIFICATE OF CORRECTION.

Patent No. 2,310,375.  February 9, 1943.

ALFRED L. RUMMELSBURG.

It is hereby certified that error appears in the printed specification of the above numbered patent requiring correction as follows: Page 4, first column, line 9, claim 12, after "comprises" insert --contacting--; and that the said Letters Patent should be read with this correction therein that the same may conform to the record of the case in the Patent Office.

Signed and sealed this 16th day of March, A. D. 1943.

(Seal)  Henry Van Arsdale,
Acting Commissioner of Patents.